(12) United States Patent
Dietrich et al.

(10) Patent No.: US 6,520,037 B2
(45) Date of Patent: *Feb. 18, 2003

(54) GEAR UNIT

(75) Inventors: Johannes Dietrich, Gilching (DE); Bernd Gombert, Grafrath (DE); Ingo Schefer, Gilching (DE)

(73) Assignee: Deutsches Zentrum fur Luft-Und Raumfahrt E.V., Köln (DE)

( * ) Notice: Subject to any disclaimer, the term of this patent is extended or adjusted under 35 U.S.C. 154(b) by 34 days.

This patent is subject to a terminal disclaimer.

(21) Appl. No.: 09/808,038

(22) Filed: Mar. 15, 2001

(65) Prior Publication Data

US 2001/0010175 A1 Aug. 2, 2001

Related U.S. Application Data

(63) Continuation-in-part of application No. 09/424,957, filed as application No. PCT/EP98/03371 on Jun. 5, 1998.

(30) Foreign Application Priority Data

Jun. 6, 1997 (DE) .......................................... 197 23 812

(51) Int. Cl.⁷ ............................................... F16H 19/00
(52) U.S. Cl. ....................................... 74/89.18; 74/89.2
(58) Field of Search .............................. 74/89.18, 89.2, 74/89, 89.16, 89.21, 10.7

(56) References Cited

U.S. PATENT DOCUMENTS

| 3,696,683 A | 10/1972 | Jensen |
|---|---|---|
| 5,105,672 A | 4/1992 | Carson et al. |
| 5,209,661 A | 5/1993 | Hidreth et al. |
| 5,655,617 A | 8/1997 | Marshall |
| 5,921,344 A | 7/1999 | Boyer |
| 6,163,148 A | 12/2000 | Takada et al. |
| 6,234,035 B1 * | 5/2001 | Dietrich et al. ............. 222/518 |

FOREIGN PATENT DOCUMENTS

| DE | 29704834 | 5/1997 |
|---|---|---|
| DE | 19547432 | 7/1997 |

* cited by examiner

*Primary Examiner*—Saul Rodriguez
(74) *Attorney, Agent, or Firm*—Browdy and Neimark, P.L.L.C.

(57) ABSTRACT

A gear unit in which a cable, band or similar device is fitted between the drive and the output in order to transform a fast rotational movement at the drive end, which is limited in both directions, into a slow rotational movement at the output end. The cable is fastened at both ends to an oscillating intermediary single-piece divided into two segments, and rests against the outer walls of the intermediary piece and is wound around the shaft of the drive so as to transfer a driving torque. A position sensor is assigned to the inner segment of the intermediary piece, and/or a torque sensor is mounted between both segments of the intermediary piece. A fast rotational movement of the drive is transformed into a slow rotational movement without play, and provides a good synchronization characteristic.

10 Claims, 3 Drawing Sheets

GEAR UNIT

The present application is a CIP of copending parent application Ser. No. 09/424,957, filed as PCT/EP98/033731 on Jun. 5, 1998, and published in a language other than English, and with the English text having been filed in the parent application upon entry into the U.S. National Stage on Dec. 6, 1999.

FIELD OF THE INVENTION

The present invention relates to a gear unit for converting a fast, drive-side rotational movement that is limited in both directions into a slow rotational movement on the output side.

BACKGROUND OF THE INVENTION

U.S. Pat. No. 5,105,672 discloses a unit of this general type, in which a force-transmitting element in the form of at least one cable is provided between the drive and the output.

SUMMARY OF THE INVENTION

It is an object of the invention to provide a gear unit that operates without play, and has a good synchronization characteristic, with an output that only fluctuates slightly when the input rpm remains unchanged, and with which positions can be determined and/or torques or forces can be detected.

In accordance with the invention, this object is accomplished by a gear unit for converting a fast, drive side rotational movement that is limited in both directions into a slow rotational movement on the output side, the unit being characterized in that the force-transmitting element acts on a one-piece, pivotably-seated intermediate part that is divided into two segments, with a position sensor being associated with an inside segment of the intermediate part, or a torque sensor being provided between the two segments of the intermediate part.

Thus, the gear unit of the invention, a force-transmitting element acts on a one-piece intermediate part that is divided into two segments and seated to pivot. A position sensor is allocated to an inside segment of the intermediate part, and/or a torque sensor is disposed between the two segments of the intermediate part.

In accordance with a preferred modification of the invention, the intermediate part comprises the inside segment and an approximately U-shaped outside segment that partially surrounds the inside segment. A slot that extends in an approximate U-shape is provided between the two segments. Furthermore, the two legs of the U-shaped outside segment are thinner than a center part that connects these two legs to one another.

In accordance with a preferred embodiment of the gear unit of the invention, a cable, band or the like is provided as a force-transmitting element between the drive and the output; and the two ends of the element are secured to the pivotably-seated intermediate part. The cable extends against the outer sides of the intermediate part, and is wound once or multiple times around the shaft of the drive, preferably in the form of an electric motor, for transmitting a drive moment.

In accordance with a further preferred embodiment of the invention, the force-transmitting element is a frictional wheel that is provided at the drive shaft and rests, in a frictional lockup, against the outer surface of the outside segment of the intermediate part, the surface being provided as a frictional surface. In a further preferred embodiment of the gear unit of the invention, the force-transmitting element is a toothed wheel that is secured to the drive shaft and is in a non-positive engagement with a toothing that is embodied on the outer segment and corresponds to a toothed rack.

According to the invention, on one side of the inside segment, an opto-electronic, position-sensitive detector is associated with the position sensor that is associated with the inside segment of the intermediate part, and a light source is provided on the other side. Between these, a slot that extends with a radially changing (e.g., spiral-shaped) course is provided in the inside segment. The shape—for example, a spiral—of the slot is selected such that a linear connection is formed between an angular change in the intermediate part and the displacement of the light beam on the detector.

Also in accordance with the invention, a torque sensor is or can be provided at the two segments of the intermediate part. An opto-electronic, position-sensitive detector that serves as a torque sensor is mounted in the center of a center part of the outside segment. On the other side of a slot embodied between the inside and outside segments, a slotted screen is mounted to the inside segment directly opposite the detector; a light source is disposed behind this screen.

According to the invention, therefore, a mechanical gear is produced, which converts a fast rotational movement of the drive that is limited in both directions into a slow rotational movement of the output, the transmission being effected without play and with a good synchronization characteristic. According to the invention, a sensor mechanism in the form of the position sensor and/or the torque sensor is integrated into the gear unit, the former generally determining the position and/or the latter measuring the torque of the drive or output. In the present invention, one or both of the two optical sensors is or are directly integrated into the gear unit in an especially compact manner.

Because of the special design of the U-shaped outside segment, the electro-optical, position-sensitive detector which operates as a torque sensor and is mounted in the center of the outside segment can detect a bending in the two legs of the U-shaped outside segment, which act like bending girders that are clamped on one side; this bending corresponds to the torque that is applied in the drive or output direction, respectively, and from which a corresponding force can be calculated in a known manner. Thus, a force-reflecting sensor mechanism is created, with which the force that is decisive in any type of tactile processes can ultimately be detected.

BRIEF DESCRIPTION OF THE DRAWINGS

Preferred embodiments of the invention are described in detail below, with reference to the attached drawings, wherein.

DETAILED DESCRIPTION OF THE INVENTION

Figure 1:
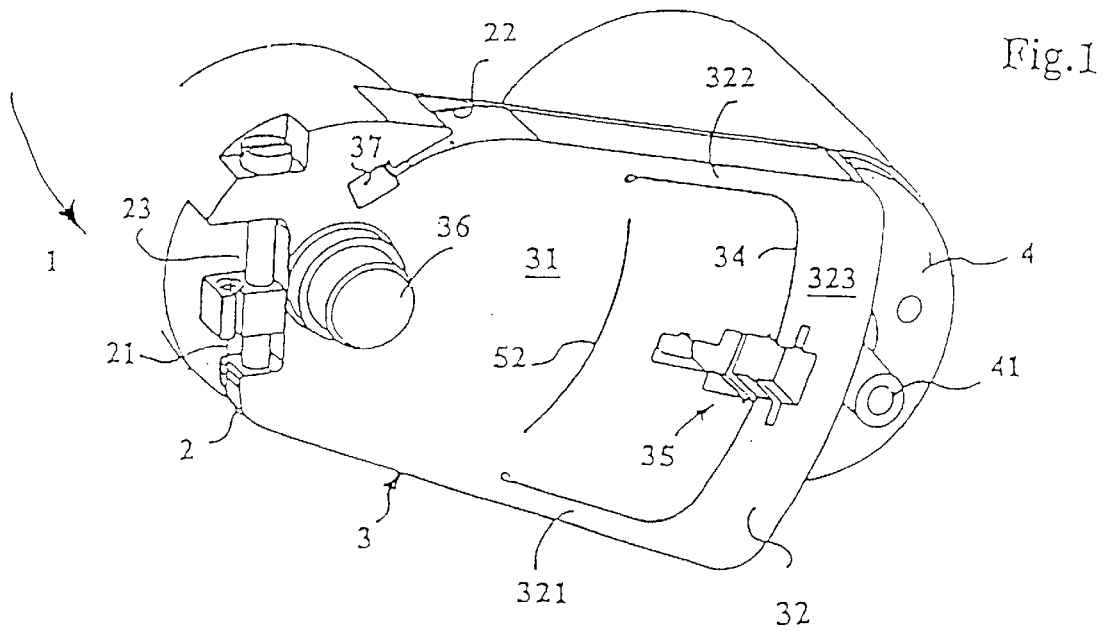
FIG. 1 is a front view, in perspective, of essentially an intermediate part of a gear unit according to the invention.

FIG. 1 is a plan view, in perspective, of an intermediate part 3 of a gear unit 1. The intermediate part 3 is pivotably-seated in the wall of a housing, not shown in detail, by way of a pivoting pin 36.

The one-piece intermediate part 3 is divided by a slot 34 into an inside segment 31 and an outside segment 32, which partially surrounds the segment 31 and is approximately U-shaped in the plan view. A center part 323 of the outside segment 32 makes a transition into two legs 321 and 322, which, in the plan view, are considerably narrower, i.e. considerably thinner in cross section, than the center part 323 connecting them.

FIG. 1 indicates a cable 2, which is secured by one end 21 in an adjustable clamping device 23, while the other cable end 22 is held in a recess 37 indicated in the upper region of the intermediate part 3.

In FIG. 1, the cable extends, from the clamping device 23, against the lower outer surface of the intermediate part 3, is wrapped with one or preferably several windings 20 (FIGS. 2a and 3) around a shaft 41 of a drive 4, preferably in the form of an electric motor, then lies again against the upper outer surface of the intermediate part 3. The number of windings 20, for example three in FIGS. 2b and 3, depends on the driving torque to be transmitted, which acts through a frictional or non-positive lockup on the cable 2.

Moreover, the magnitude of a torque conversion depends on the ratios of the radii, namely the radius of the intermediate part 3 from the center of the pivoting pin 36 to the outside edge of the center part 323 of the outside segment 32 in relation to the radius of the drive shaft 41. Thus, the ratios of the radii of the drive and intermediate-part surfaces rolling onto one another determine the magnitude of the torque conversion. If, in a preferred embodiment of the gear unit of the invention, the cable that is clamped on both sides is used to couple the drive shaft 41 and the intermediate part comprising two segments, a play-free gear having a high efficiency and very good synchronization characteristics is created.

Figure 2A:
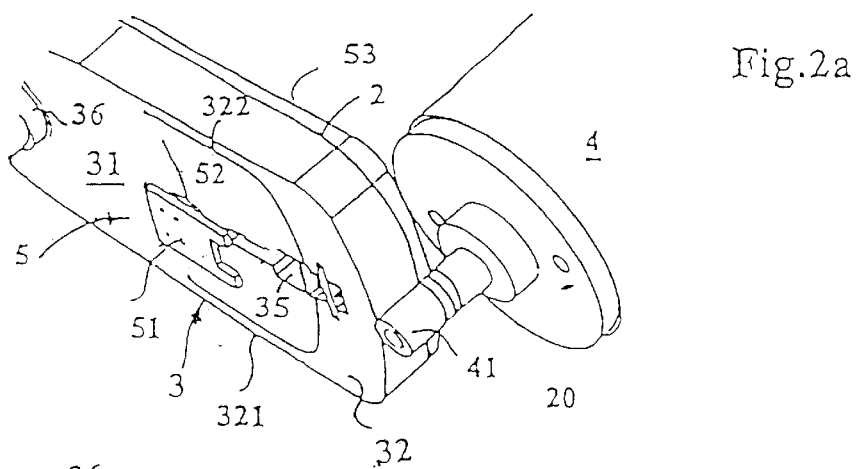
FIGS. 2a and 2b are front view and a plan view, respectively, also in perspective, of the intermediate part of the gear unit of the invention, with an installed position sensor.
Figure 2B:
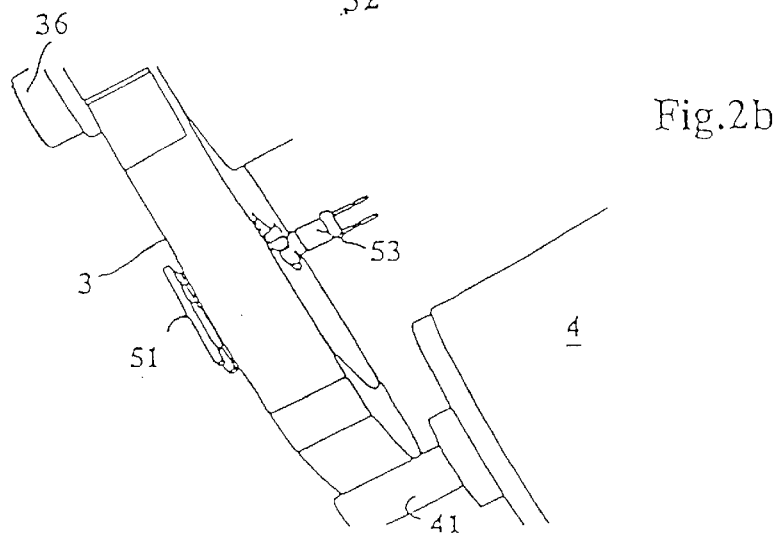

FIGS. 2a and 2b show a front view and a plan view, respectively, of the right portion (in FIG. 1) of the intermediate part 3, and the drive motor 4 with its drive shaft 41. FIGS. 2a and 2b further show a position sensor, which is indicated in its entirety by 5, and is formed from an opto-electronic, position-sensitive detector 51, which is disposed on the one side, in FIG. 2a the front side, of the intermediate part 3, and a light source 53 that is disposed on the other side, in FIG. 2b the rear side, of the intermediate part 3.

A spiral-shaped slot 52 is provided between the opto-electronic, position-sensitive detector 51 serving as a position sensor 5 and the light source 53 such that the part of the spiral slot that enters the region of the position sensor extends approximately in a straight line, although it is shifted radially during the pivoting movement.

Because of its special design, the slot 52 moves back and forth in a straight line in front of the opto-electronic, position-sensitive detector 51 serving as a position sensor 5, specifically perpendicular to the longitudinal axis of the detector, during a pivoting movement of the intermediate part 3 about the pivoting pin 36.

Furthermore, both FIGS. 1 and 2a show recesses 35 in the intermediate part 3, in which the torque sensor 6 is optionally accommodated, as will be described in detail below in connection with FIGS. 3 and 4.

Figure 3:
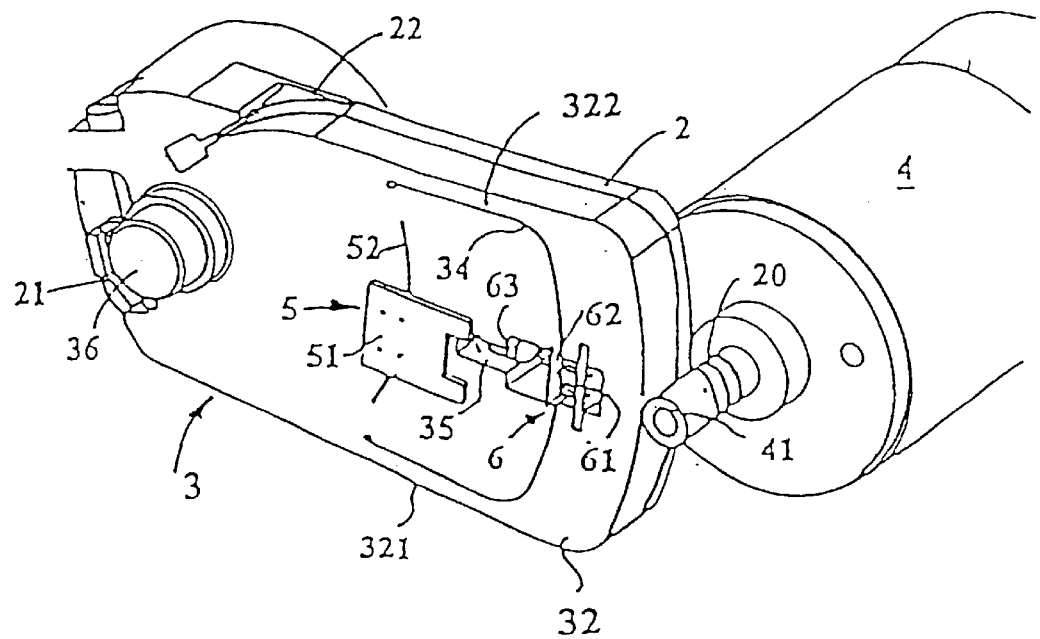
FIG. 3 is a front, perspective view, which corresponds to that of FIG. 1, of the intermediate part of the gear unit according to the invention, with installed position sensor and torque sensor, it being understood that the present invention includes the presence of either said sensor without the presence of the other said senor.

The perspective illustration of FIG. 3 essentially corresponds to that of FIG. 1, with the difference that in FIG. 3, the torque sensor 6 is schematically represented in perspective in addition to the opto-electronic position-sensitive detector 51 of the position sensor 5.

Here, the torque sensor 6 includes a light source 63 and an opto-electronic, position-sensitive detector 61, which is mounted in the center of the center part 323 of the outside segment 32. A slotted screen 62 is mounted to the inside segment 32, between the two elements 61 and 63. Also, FIG. 2a schematically indicates the windings 20—for example, three—of the cable 2 as being wound around the motor shaft 41.

Figure 4:
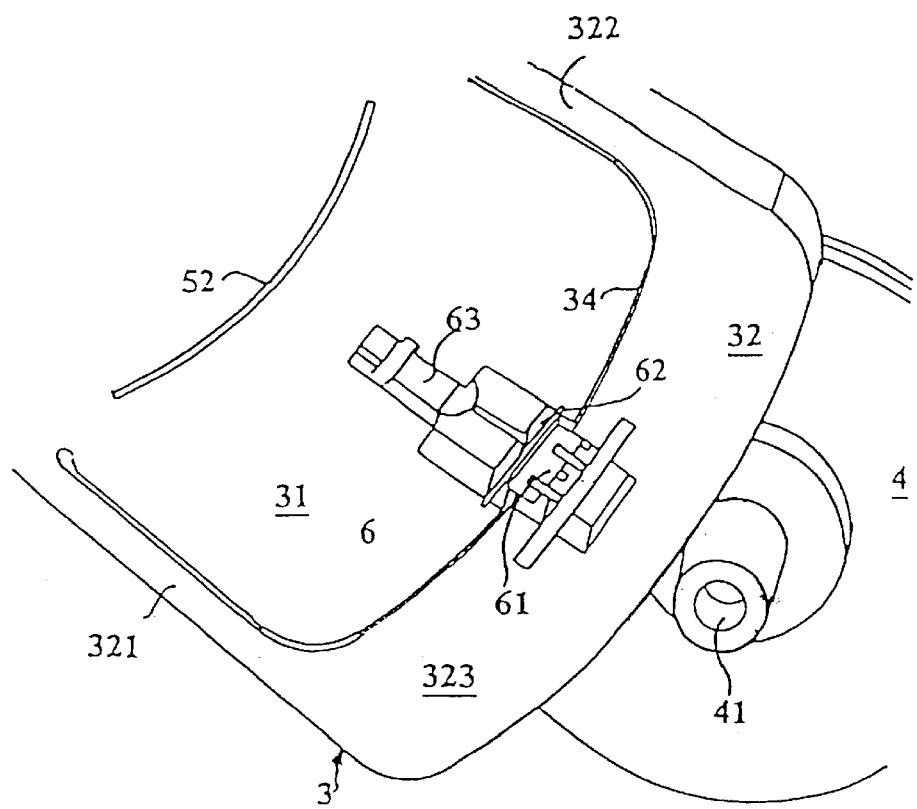
FIG. 4 is a plan view, in perspective, of a part of the intermediate part, with an installed torque sensor.

FIG. 4 is merely an enlarged view of the right part—in FIG. 3—of the segments 31 and 32 of the intermediate part 3, the drive 4 and in particular the torque sensor 6.

Figure 5:
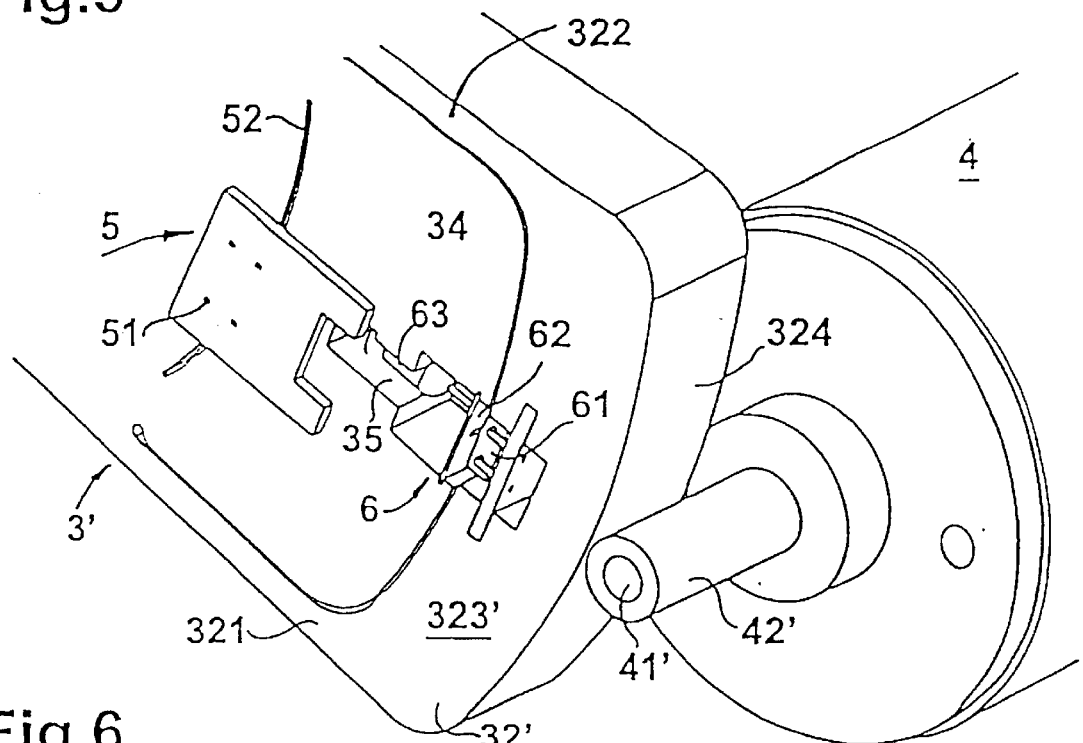
FIG. 5 is a front, perspective view, which corresponds to the right portion of FIG. 3, of the intermediate part of the gear unit according to a second preferred embodiment of the invention, with an installed position sensor and torque sensor, it again being understood that either of these sensors may be used in the absence of the other.

FIG. 5 is a front, perspective view, which corresponds to the right portion of FIG. 3, of the intermediate part 3' of a second preferred embodiment of the gear unit according to the invention, with an installed position sensor 5 and torque sensor 6, either o which may be omitted. In FIG. 5, all of the parts that have already been described in conjunction with FIGS. 1 through 4 are provided with the same reference characters, and therefore are not explained again.

The second embodiment in FIG. 5 differs from the embodiment shown in FIGS. 1 through 4 in that a frictional wheel 42 provided at the drive shaft 41' is used as the force-transmitting element, instead of the cable 2; this wheel rests, in a frictional lockup, against the outer surface 324 of the center part 323' of the outside segment 32' of the intermediate part 3', the outer surface being embodied as a frictional surface.

Figure 6:
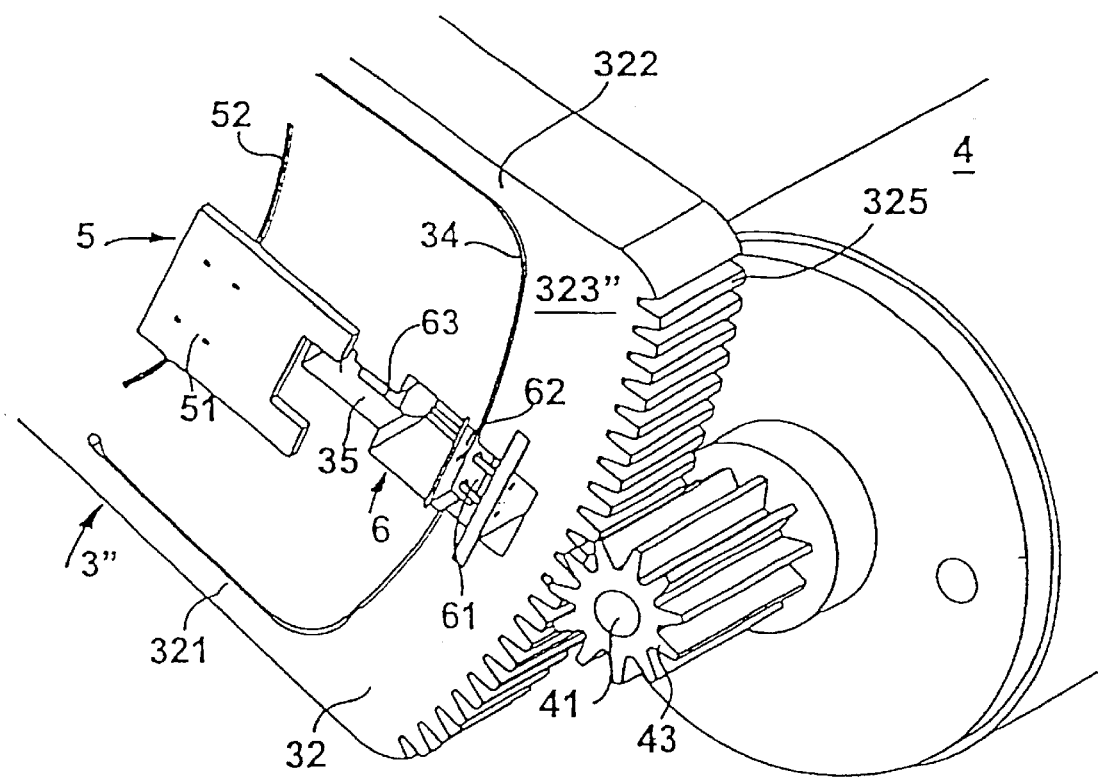
FIG. 6 is a front, perspective view, which corresponds to the right portion of FIG. 3, of the intermediate part of the gear unit according to a third preferred embodiment of the invention, with an installed position detector and torque sensor, either or both of which may be present.

Unlike FIG. 5, the third preferred embodiment of the invention, which is shown in FIG. 6, has a toothed wheel 43 as a force transmitting element, which is secured to the drive shaft 41 and meshes in a non-positive lockup with a toothing 325 provided on the center part 323" of the outside segment 32" and corresponds to a toothed rack.

In the second and third embodiments of the gear unit according to the invention, as shown in FIGS. 5 and 6, the magnitude of a torque conversion again depends on the ratio of the radii, namely the radius of the intermediate part 3, which extends from the center of the pivoting pin, not shown in FIGS. 5 and 6, to the outside edge of the center part 323', 323" of the outside segment 32', 32", respectively, in relation to the radius of the frictional wheel 42, or the diameter of the pitch circle of the toothed wheel 43 secured to the drive shaft 41. Thus, in these embodiments the ratios of the radii of the surfaces rolling onto one another, or the engaged toothings of the drive 4 and the intermediate part 3', 3", determine the magnitude of the torque conversion.

If the intermediate part 3 is pivoted counterclockwise, the two legs 321 and 322 of the outside segment 3, which can be viewed as bending girders that are held or clamped on one side, i.e., on the inside segment 31, S are "bent" downward in FIGS. 3, 5 or 6, or "bent" upward during a clockwise pivoting movement.

During a bending process of this nature, the light. beam passing through the slotted screen 62 of the torque sensor 6 travels upward during a counterclockwise pivoting movement in FIG. 3, or downward during a clockwise pivoting movement in FIGS. 3, 5 or 6. This movement of the light beam due to the relative movement between the slotted screen 62 and the opto-electronic, position-sensitive detector 61 of the torque sensor 6 is detected by the torque sensor; the position of the incident light beam is consequently measured.

The torque of the drive and output can be derived from the change in the position of the light beam on the detector 61 and the geometry of the two legs 321 and 322 acting as bending girders.

In accordance with the present invention, therefore, both a position sensor and a torque sensor, when both are present, are integrated in a compact manner into the mechanics of a play-free gear having a very good synchronization characteristic; when only one sensor is present, it is similarly integrated. Therefore, with the present invention, an extremely economical and precise, analog, optical measuring system is created, which is integrated in a compact manner into the gear unit, and with which either or both the position and torque can be measured.

According to the invention, the gear unit 1 with the integrated sensor mechanism in the form of the position sensor 5 and the torque sensor 6 can generally be used to detect tactile processes.

Two gear units 1 having an integrated sensor mechanism (5, 6) can be connected to an input device that detects the respective pivoting position and transmits the force.

Also according to the invention, a gear unit 1 can be used to act upon a gas pedal with a force, in which case the vehicle driver is provided in a tactile manner with a force that counteracts his force on the gas pedal when, for example, the vehicle passes a road sign whose position is detected in a vehicle-navigation system. Through this tactile process, the vehicle link receives a distinct indication to reduce speed when passing the road sign. Furthermore, in accordance with the invention, a gear unit 1 can be used to act upon a brake pedal that transmits a force. A gear unit 1 can also be used to act upon a steering wheel that transmits a force.

According to the invention, one or more gear units can be used to set the headlights of a motor vehicle. Moreover, in accordance with the invention, at least one gear unit having an integrated sensor mechanism can be used as a robotic link.

Also in accordance with the invention, two gear units can be connected and switched so as to create a stick in an aircraft that transmits forces.

Through the use of at least one gear unit, an input and control device that transmits forces can be created, with which assembly procedures, such as joining processes, can be performed.

At least one gear unit according to the invention can also be used as a force-transmitting input and control device, with which, for example, wheelchairs of disabled individuals can be rendered controllable.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A gear unit for converting a fast, drive-side rotational movement that is limited in both directions into a slow output movement by a force-transmitting element, which is provided between a drive and an output, characterized in that the force-transmitting element (2; 42, 324; 43, 325) acts on a one-piece, pivotably-seated intermediate part (3; 3', 3") that is divided into two segments (31; 32, 32', 32"), with a position sensor (5) being associated with an inside segment (31) of the intermediate part, or a torque sensor (6) being provided between the two segments of the intermediate part.

2. The gear unit according to claim 1, characterized in that the intermediate part (3, 3', 3") comprises the inside segment (31) and an approximately U-shaped outside segment (32, 32', 32") that partially surrounds the inside segment (31), with a slot (34) that extends in an approximate U shape being embodied between the two segments.

3. The gear unit according to claim 2, characterized in that two legs (321, 322) of the approximately U-shaped outside segment (32, 32', 32") are thinner than a center part (323, 323', 323") that connects the legs to one another.

4. The gear unit according to claim 1, characterized in that the force-transmitting element is a cable or a band (2) that is secured by both ends (21, 22) to the pivotably-seated intermediate part (3), extends along and against outer sides of the intermediate part and is wound around a shaft (41) of the drive (4) for a non-positive-lockup transmission of a driving torque.

5. The gear unit according to claim 1, characterized in that the force-transmitting element is a frictional wheel (42) that is provided at the drive shaft (41') and rests, in a frictional lockup, against the outer surface (324) of an outside segment (32') of the intermediate part (3'), the outer surface being embodied as a frictional surface.

6. The gear unit according to claim 1, characterized in that the force-transmitting element is a toothed wheel (43) that is secured to a drive shaft (41) and is in a non-positive engagement with a toothing (325) that is embodied on an outside segment (324) and corresponds to a toothed rack.

7. The gear unit according to claim 1, characterized in that an opto-electronic, position-sensitive detector (61) serving as a torque sensor (6) is mounted in the center of a center part (32, 323', 323") of an outside segment (32, 32', 32"), and, on the other side of a slot (34) embodied between the inside and outside segments, a slotted screen (62) is mounted to the inside segment (31) directly opposite the detector, with a light source (63) being disposed behind this screen.

8. The gear unit according to claim 1, characterized in that a slot (52) having a radially-variable course is embodied in the region of the inside segment (31), with which the position sensor (5) is associated, with an opto-electronic, position-sensitive detector (51) that serves as a position detector (5) being associated with the sensor on one side of the inside segment (31), and a light source (53) being associated with the sensor on the other side of the inside segment (31).

9. The gear unit according to claim 4, characterized in that an adjustable cable-tension device (23) is accommodated at one end (21) of the cable (2), on the side of the intermediate pare (3) opposite the torque sensor (6).

10. A method comprising using at least two gear units according to any one of claims 1 through 9, which are connected to an input device that transmits a force.

* * * * *